United States Patent [19]

Pace et al.

[11] Patent Number: 4,724,540

[45] Date of Patent: Feb. 9, 1988

[54] SPEAKERPHONE WITH FAST IDLE MODE

[75] Inventors: W. David Pace, Tempe; Dennis L. Welty, Mesa, both of Ariz.

[73] Assignee: Motorola, Inc., Schaumburg, Ill.

[21] Appl. No.: 902,920

[22] Filed: Sep. 2, 1986

[51] Int. Cl.$^4$ .................. H04M 1/62; H04M 9/10
[52] U.S. Cl. .................................................. 379/389
[58] Field of Search ............... 379/390, 420, 421, 388, 379/347

[56] References Cited

U.S. PATENT DOCUMENTS 4,513,177  4/1985  Nishino ............................... 379/389
4,555,596 11/1985  Blomley .............................. 379/389

Primary Examiner—Stafford D. Schreyer

Attorney, Agent, or Firm—Michael D. Bingham

[57] ABSTRACT

A speakerphone circuit having fast sensitive switching between the receive mode and the transmit mode is disclosed which includes circuitry for providing four point sensing at the input and output of both the transmit and receive attenuators located in the transmit and receive signal paths thereof for controlling the gains of the attenuators in a complementary manner. A logic control circuit comprising a controller circuit provides an attenuator algorithm that first detects that voice signals are present in both signal paths then quickly causes the attenuators to be set to equal gains during a fast idle mode to then allow the stronger of the two signals to set the operating mode of the speakerphone.

25 Claims, 2 Drawing Figures

SPEAKERPHONE WITH FAST IDLE MODE

BACKGROUND OF THE INVENTION

The present invention relates to telephony systems and, more particularly, to speakerphone circuits which interface with telephone lines to provide voice-switched speech communication.

Prior art integrated speakerphone circuits are well known. For instance, the MC34018 Speakerphone Circuit manufactured by Motorola Inc. provides voice-switched half-duplex communication. Prior art speakerphones comprise both transmit and receive signal paths each of which include an attenuator in series with the signal path. The transmit and receive attenuators operate in a complementary manner, i.e., while one is at maximum gain the other is at maximum attenuation.

Typically, control of the respective gains of the transmit and receive attenuators is accomplished by comparing the amplitude of the transmit signal appearing at the output of the transmit attenuator to the receive signal appearing at the input of the receive attenuator and controlling the level of a control voltage differentially supplied to the attenuators. Hence, if a far-end talker is speaking the receive signal will be greater than the transmit signal and the transmit attenuator will be at maximum loss while the receive attenuator is at maximum gain. This is referred to as the receive mode of operation. Conversely, if the near-end talker is speaking the transmit signal will be greater than the receive signal and the gain of the transmit attenuator is maximized while that of the receive attenuator is minimized. In this mode the speakerphone is in a transmit mode. Finally, if neither talker is speaking, the control voltage goes to an idle mode value which sets the gains of the two attenuators to an equal mid-value setting to allow the first person speaking to set the speakerphone in the correct mode of operation.

Because comparison of the transmit and receive signals occurs after the transmit attenuator it is very difficult for the near-end talker to break-in on the far-end talker since the transmit attenuator is at maximum loss. The same is true even if the far-end talker has paused.

Hence, a need exists for a high quality speakerphone having fast sensitive switching between the receive and transmit modes.

SUBJECT OF THE INVENTION

Accordingly, it is an object of the present invention to provide an improved speakerphone circuit.

It is another object of the present invention to provide an improved speakerphone having a fast idle mode.

Still another object of the present invention is to provide an integrated speakerphone with fast idle mode.

In accordance with the above and other objects there is provided a speakerphone having transmit and receive signal path each of which includes a respective attenuator operating in a complementary manner and comprising a circuit for sensing the relative amplitudes of the transmit and receive signals appearing at the respective inputs and outputs of the two attenuators for providing logic control signals and a control circuit that is responsive to the logic control signals for providing a control voltage the magnitude of which is varied to selectively vary the gains of the transmit and receive attenuators.

A feature of the invention is that the control circuit is responsive to a first set of the logic control signals for setting the gains of the two attenuators equal within a first time interval and is responsive to a second set of logic control signals for setting the attenuator gains equal within a second time interval, the first time interval being significantly shorter than the second time interval.

DETAILED DESCRIPTION OF THE PREFERRED EMBODIMENT

Figure 1:
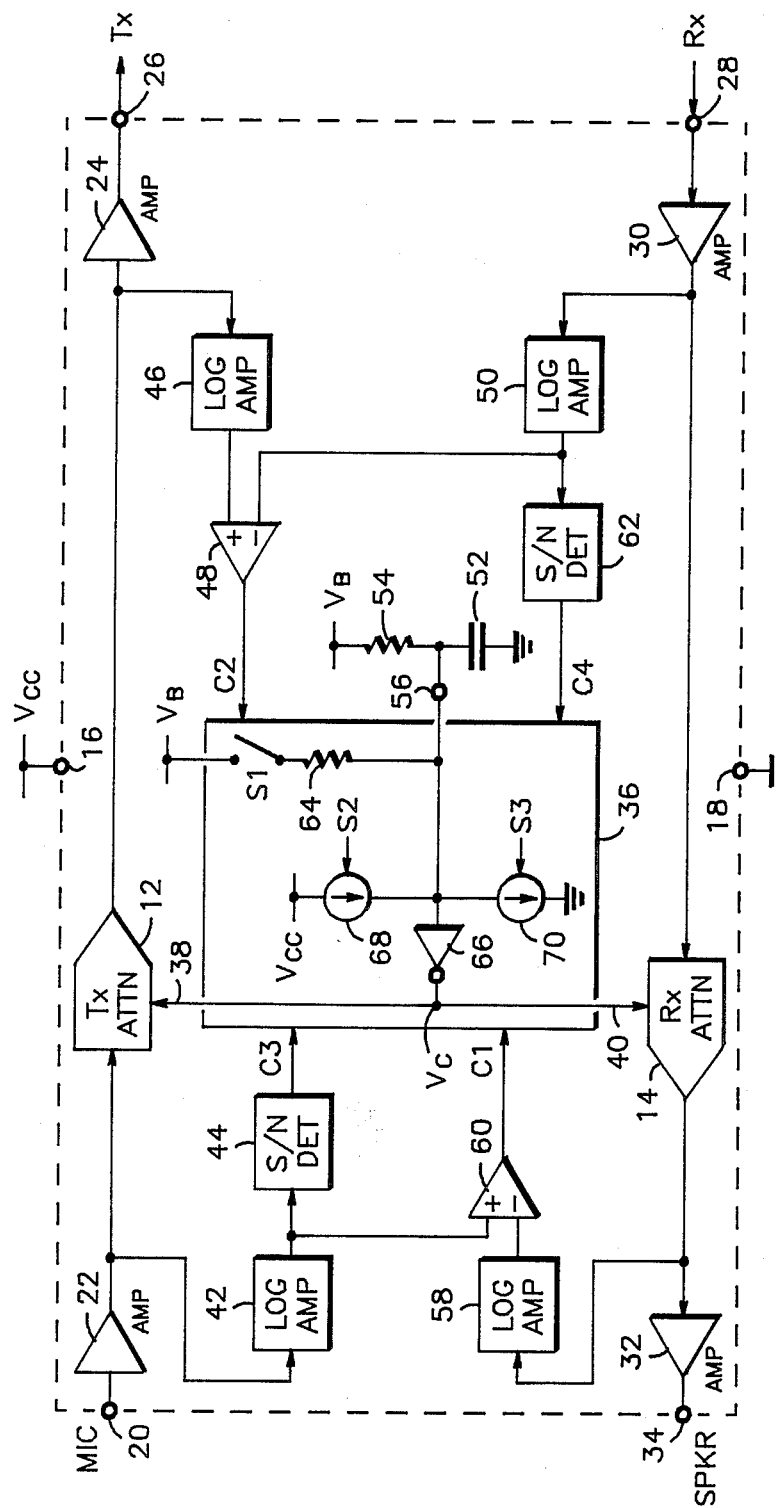
FIG. 1 is a simplified partial schematic and block diagram illustrating the speakerphone of the present invention.

Turning to FIG. 1, there is illustrated integrated speakerphone circuit 10 of the present invention. Speakerphone circuit 10 is voice-switched between a transmit (Tx) and a receive (Rx) mode in a half-duplex, hands free operation. Half-duplex operation is accomplished by controlling the gains/attenuation of attenuators 12 and 14. Attenuators 12 and 14 operate in a complementary manner, i.e., in response to a direct current (DC) control signal applied thereto the gain of one attenuator is maximized while the gain of the other is minimized. Power supply voltage Vcc is applied across terminals 16 and 18. The transmit signal path including transmit attenuator 12 is coupled to input terminal 20 through amplifier 22. A microphone (not shown) would be connected to terminal 20. The output of transmit attenuator is connected to the transmit output terminal 26 through amplifier 24. The receive signal path includes receive attenuator 14 coupled in series between the output of amplifier 30 to input terminal 28 and the input of amplifier 32 to output terminal 34. Output terminal 34 in operation is connected to a speaker (not shown). Output terminal 26 and input terminal 28 would be coupled to the telephone lines via appropriate circuitry as understood. Attenuator controller circuit 36 provides the control voltage Vc to vary the gains of attenuators 12 and 14 in response to the logic signal supplied at the C1, C2, C3 and C4 inputs thereof as will be discussed in detail hereinafter. The output of amplifier 22 is sensed by logarithmic amplifier 42 and signal to noise detector 44 to produce a logic one signal at C3 whenever the output of the amplifier is voice, otherwise the output of detector 44 is a logic zero. The transmit signal appearing at the output of transmit attenuator 12 is sensed via logarithmic amplifier 46 and compared with the receive signal appearing at the output amplifier 30 via logarithmic amplifier 50. The outputs of logarithmic amplifiers 46 and 50 are supplied to the non-inverting and inverting inputs respectively of comparator 48, the output of which is connected to the C2 input of controller circuit 36. If the amplitude of the transmit signal applied to comparator 48 is greater than the amplitude of the receive signal the output of the comparator will be in a logic one level state.

Speakerphone circuit 10 as so far described is similar to known prior art speakerphones, for instance the aforementioned MC34018 speakerphone circuit. Hence, if the near-end talker is speaking into the microphone and the far-end talker is listening, speakerphone 10 is placed in the Tx mode by C3 and C2 inputs being in a logic one state. In this mode the magnitude of Vc is increased to maximize the gain of transmit attenuator 12 while the attenuation of receive attenuator 14 is maximized. Similarly, in response to a receive signal applied at input 28, speakerphone circuit 10 will be placed in a Rx mode as C2 input is low. If neither talker is speaking, C3 is low and speakerphone circuit 10 is placed in an idle mode wherein the gains of the two attenuators are adjusted to be equal by Vc being reduced to zero volts. The idle mode allows the next person to speak to determine the mode of operation of the speakerphone. At idle, Vc is set to the value $V_B$ by allowing capacitor 52 to be charged through resistor 54. This idle mode is referred to as a slow idle mode as the time constant is large enough to allow slow discharge of capacitor 52.

When the far-end talker pauses, speakerphone circuit 10 should quickly respond to the near-end talker. However, as previously mentioned, speakerphone circuit 10 as thus described, which is similar to prior art speakerphones, may not allow break-in by the near-end talker using only the two point sensing (the outputs of logarithmic amplifiers 46 and 50) due to the signal loss of the transmit signal through attenuator 12 while the circuit is in the receive mode. The subject of the present invention is to provide four point sensing to provide an attenuator control algorithm that detects that voice signals are present in both channels and then quickly switches both attenuators to equal gain and finally resolves which signal channel has the larger signal level. This quick switching to equal gains is referred to as the fast idle mode and is only transitory in nature, i.e., after having set the gains of the two attenuators equal the speakerphone will immediately switch to the mode that has the stronger voice signal.

Referring back to FIG. 1, speakerphone circuit 10 of the present invention includes four point sensing through the addition of logic control inputs C1 and C4 to controller circuit 36. The C1 input senses the amplitudes of the transmit signal appearing at the output of logarithmic amplifier 42 with the receive signal appearing at the output of receive attenuator 14 through logarithmic amplifier 58. These two relative magnitudes are compared by comparator 60 to provide an input signal at the C1 input of control circuit 36. The fourth input to the C4 logic input of controller 36 is provided by signal to noise detector 62. The logarithmic amplifiers provide AC to DC conversion and operate as peak detectors.

Controller circuit 36 is shown functionally as including fast idle mode switch S1 which connects resistor 64 to $V_B$ when closed to permit fast charging or discharging of capacitor 52. Capacitor 52 is connected along with distal end of resistor 64 to inverter buffer amplifier 66 which provides control voltage Vc. Additionally, controller circuit 36 includes current source 68 coupled between Vcc and terminal 56 which when activated by control signal S2 will charge capacitor 52 thereby decreasing Vc. Finally, current source 70 which is coupled between terminal 56 and circuit ground will discharge capacitor 52 when activated to cause Vc to increase.

As will be described in more detail later, the output logic signals from comparator 60, comparator 48, detectors 44 and 62 drive integrated injection logic ($I^2L$) circuitry within controller 36 to operate switches S1, S2 and S3 for adjusting the gains of the attenuators by varying Vc by, in turn, charging and discharging of capacitor 52 during the operating modes of speakerphone circuit 10.

Speakerphone circuit 10 will be put in the transmit mode whenever the logic inputs to C1, C2 and C3 are all high. This indicates that the transmit signal is both voice and is greater in amplitude than the receive signal. Conversely, if the logic inputs to C1 and C2 are both zero and C4 is a logic one, speakerphone 10 is put in a receive mode of operation. The fast idle mode is selected whenever C1 and C2 inputs differ and either C3 or C4 inputs are in a logic one state. This condition occurs when there is a conflict as to which signal is present and has the greater amplitude. The fast idle mode is then selected by S2 and S3 switching off current sources 68 and 70 while S1 connects resistor 64 between terminal 56 and $V_B$. Capacitor 52 is then allowed to quickly charge or discharge to $V_B$ to adjust the level of Vc to set the gains of attenuators 12 and 14 equal. The attenuators then will switch to either the receive or transmit mode from the fast idle mode when the C1 and C2 inputs match. This occurs due to the fact that because the gains of the two attenuators are equal the stronger voice signal will cause the output of comparators 48 and 60 to go to equal output states. The switching to and from the fast idle mode is sufficiently quick so that no noticeable delay in operation can be heard.

Figure 2:
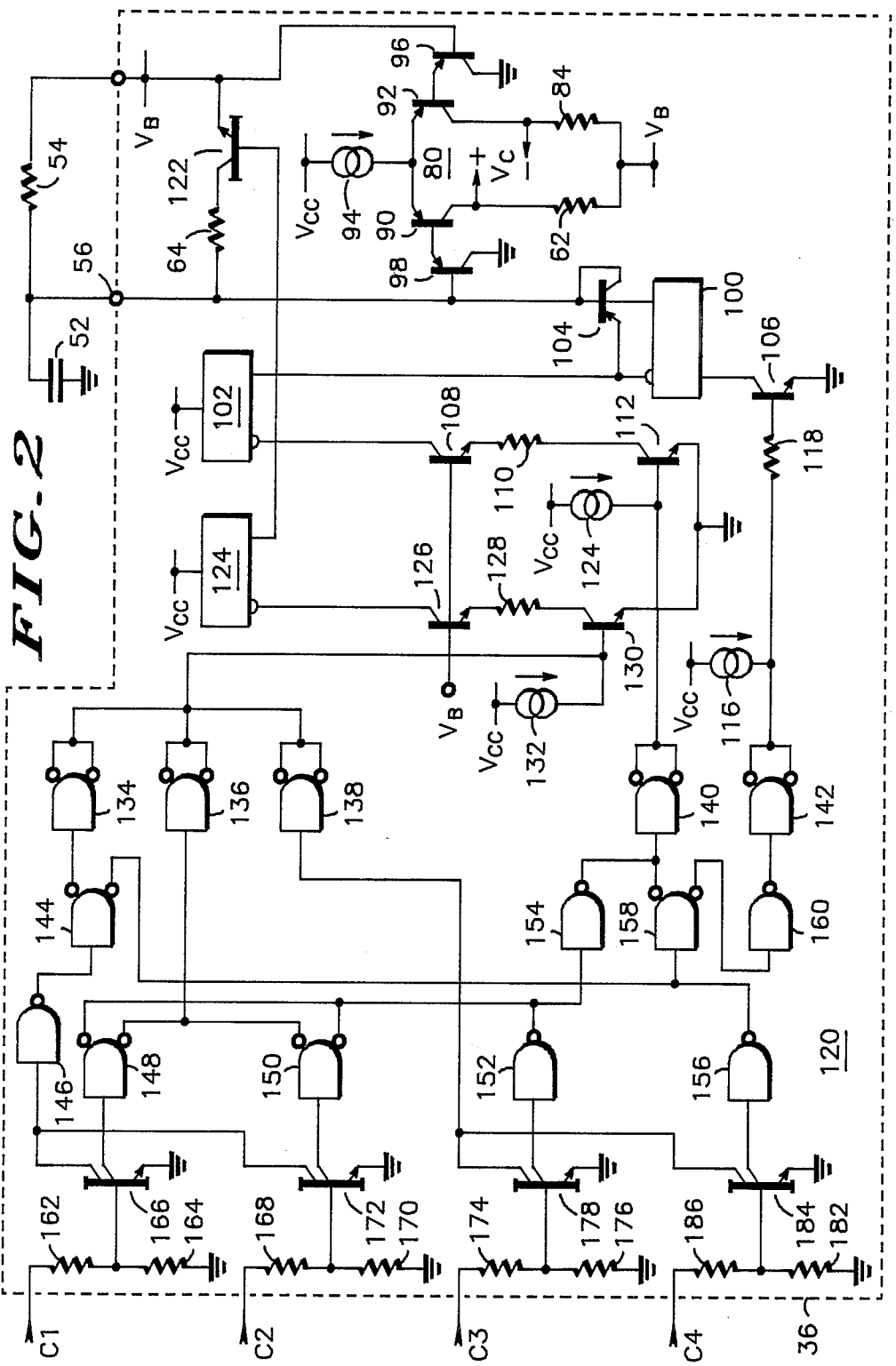
FIG. 2 is a schematic diagram illustrating the control circuit of the speakerphone of FIG. 1.

FIG. 2 shows controller circuit 36 in more detail. Vc is a differential voltage that is produced at the outputs of differential amplifier 80 across resistors 82 and 84 having the polarity as illustrated. Differential amplifier is conventional in structure comprising PNP transistors 90 and 92 differentially connected at the emitters thereof to current source 94 with their respective collectors coupled through resistors 82 and 84 to $V_B$. The bases of transistors 90 and 92 are connected to the emitters respectively of PNP transistors 98 and 96 each of whose collectors are connected to system ground. The base of transistor 96 is returned to the voltage $V_B$ (which may be equal to Vcc/2) while the base of transistor 98 is returned to terminal 56. The base of transistor 98 is also connected to the output of current mirror 100 the input of which is connected to the output of current mirror 102. The common terminal of current mirror 100 is connected in series with the collector-emitter conduction path of NPN transistor 106. Diode connected transistor 104 is coupled between the input and output of current mirror 100. The common terminal of current mirror 102 is returned to power supply voltage Vcc. The input of current mirror 102 is connected in series with the collector-emitter conduction path of NPN transistor 108 whose base is returned to bias potential Vb. The emitter of transistor 108 is connected via resistor 110 in series with the collector-emitter conduction path of NPN transistor 112, the emitter of the latter being returned to circuit ground. The base of transistor 112 is coupled to the current source 114 and to an output of $I^2L$ logic control circuit 120. Similarly, the base of transistor 106 is connected to both current source 116 and an output of logic control circuit 120 via resistor 118.

Speakerphone circuit 10 is placed in the Tx mode by transistors 106 and 112 being rendered conductive by base current being supplied thereto from current sources 116 and 114 respectively. When transistor 112 is turned on transistor 108 is turned on to sink current from current mirror 102. An output current is then sourced from the output of current mirror 102 that is sunk at the input of current mirror 100 which is rendered operative by transistor 106 being turned on. The input current to mirror 100 is mirrored in the output thereof which causes capacitor 52 to be discharged and transistors 98 and 90 to be turned on harder than transistors 92 and 96 to increase Vc in a positive sense. Thus, transmit attenuator 12 will have maximum gain while receive attenuator 14 has maximum loss. The Rx mode is selected by transistor 106 being turned off as base current is stolen therefrom through logic control circuit 120 to render current mirror 100 inoperative. However, transistor 112 remains on such that current mirror 102 still supplies an output current. In this condition, diode 104 will source the output current from current mirror 102 to capacitor 52 to charge the same. This causes transistors 92 and 96 to conduct harder than transistors 90 and 98 such that Vc becomes a negative value. The gain of receive attenuator 14 will then be maximized while that of transmit attenuator 12 is minimized. In the aforementioned slow idle mode both transistors 106 and 112 are turned off which renders both current mirrors 100 and 102 inoperative. Capacitor 52 will then be charged or discharged through resistor 54 thereby biasing the base of transistor 98 at the potential $V_B$. Hence, transistors 90, 92, 96 and 98 conduct equally wherein Vc becomes zero volts and the gains of the attenuators are equal.

The fast idle mode is selected by rendering both current mirrors 100 and 102 inoperative as described above and turning transistor switch 122 on to connect resistor 64 in parallel with resistor 54. Transistor 122 is turned on by having base current supplied to the base thereof from the output of current mirror 124. Output current is sourced from current mirror 124 when it is rendered operative by transistor 126 being turned on to sink input current therefrom through its collector-emitter conduction path. With the base of transistor 126 connected to Vb the transistor will be turned on by transistor 130, which has its collector-emitter conduction path connected in series with the emitter of transistor 126 and circuit ground via resistor 128, being turned on as base current is supplied thereto from current source 132. Base current is supplied to transistor 130 whenever the output of logic control circuit 120 connected at the base of the transistor is at a logic one output state.

$I^2L$ logic control circuit 120 comprises a plurality of interconnected $I^2L$ NAND gates 134–160 which are responsive to the logic inputs supplied to the C1, C2, C3 and C4 inputs for selectively turning on and off transistors 106, 112 and 130 as previously described. Thus, transistor 130 is turned on only when all of the outputs from gates 134, 136 and 138 are high which permits base current drive to be supplied thereto. If any output from these gates is low, the current sourced from current source 132 is conducted through the gate(s) with the low output(s) and transistor 130 is turned off. Likewise, if the output from gates 140 and 142 are low transistors 112 and 106 will be respectively turned off.

The C1 input of controller 36 is coupled through the resistive divider comprising resistors 162 and 164 to the base of $I^2L$ transistor 166. Transistor 166 is a multi-collector device having one collector connected to the input of gate 146 and the other collector connected to the input of gate 148. The emitter of transistor 166 is returned to circuit ground. The C2 input is connected to the base of transistor 172 through the resistive divider comprising resistors 168 and 170. One of the collectors of transistor 172 is connected to the input of gate 146 while the other is connected to the input of gate 150. The C3 input is connected through resistive divider comprising resistors 174 and 176 to the base of transistor 178 having one collector connected to the input of gate 138 and the other to the input of gate 152. Finally, the C4 input is connected through the resistive divider comprising resistors 180 and 182 to the base of transistor 184 having one collector connected to the input of gate 138 and the other to the input of gate of 156. The emitters of transistors 172, 178 and 184 are all returned to circuit ground.

As an example of the operation of logic control circuit 120 it is assumed that C1 input is zero while inputs C2, C3, and C4 are high, a logic one. In this example speakerphone circuit 10 will be place temporarily in the fast idle mode as transistor 122 is turned on. Thus, with C1 and C2 "0" and "1" respectively, the output of gate 146 is forced high to force the outputs of gates 144 and 134 to go low and high respectively. The output of gate 148 is simultaneously forced low to force the output of gate 136 to a high output state. The output states of transistors 178 and 184 force the output of gate 138 high. Therefore, all of the outputs of gates 134, 136 and 138 are high which permits current source 132 to turn on transistor 130 as previously described to cause transistor 122 to be switched on. Simultaneously, the output of gate 148 being low forces the output of gate 154 high which, in conjunction the output of gate 144 being low forcing the output of gate 158 high, causes the output of gate 140 low. The current from current source 114 is then sunk by gate 140 to turn off transistor 112. Since transistor 112 is turned off current mirror 102 is rendered non-operative thereby preventing current mirror 100 from sinking output current therefrom. Thus, capacitor 52 is quickly charged or discharged depending on the previous mode of operation, to cause Vc to go to zero volts.

Thus, what has been described above is a novel four point sensing speakerphone having a transient fast idle mode to permit optimum transmit and receive break-in during use thereof.

We claim:

1. A speakerphone including transmit and receive signal paths each of which has an attenuator for varying the transmission loss of the respective signal therethrough, a detector circuit for sensing if the transmit signal is voice to provide an output signal and a control circuit for providing a control signal to vary the gains of the two attenuators in a complementary manner, the improvement comprising:

a first comparator having first and second inputs coupled respectively to the output of the transmit attenuator and the input of the receive attenuator for sensing which of the signals in the transmit and receive signal paths appearing thereat is greater in amplitude to provide an output signal to the control circuit having first and second level states depending on which of said signals is the greater;

a second comparator having first and second inputs coupled respectively to the input of the transmit attenuator and the output of the receive attenuator for sensing which of the signals in the transmit and receive signal paths appearing thereat is greater in amplitude and providing an output signal to the control circuit having first and second output levels depending on which of said signals is the greater; and the control circuit being responsive to said output signals of said first and said second comparator circuits being in opposite output level states for transiently setting the gains of the transmit and receive attenuators to a mid-range value.

2. The speakerphone of claim 1 including:

an additional detector circuit for sensing if the receive signal is voice to provide an output signal to the control circuit; and the control circuit being responsive to the output signal from the detector circuit and said output signals from said first and second comparator and said additional detector circuit for selectively varying the control signal provided therefrom to vary the gains of the transmit and receive attenuators accordingly.

3. The speakerphone of claim 2 wherein the control circuit includes:

first current source means for sinking a current at an output thereof when rendered operative;

second current means for sourcing a current at an output thereof when rendered operative; and logic control circuitry responsive to said output signals supplied from said first and said second comparators, said additional detector circuit and the detector circuit for selectively rendering said first and second current source means operative.

4. The speakerphone of claim 3 wherein the control circuit includes:

a differential amplifier having first and second inputs and outputs for providing the control signal between said first and said second outputs, said first input being coupled to a first terminal at which is supplied a bias potential and said second input being coupled both to said outputs of said first and said second current source means and to a second terminal;

charge storage device connected to said second terminal; and resistive means connected between said charge storage device and said first terminal for providing a charge and discharge circuit path for said charge storage device.

5. The speakerphone of claim 4 wherein the control circuit includes switching means which is selectively enabled and disabled by said logic control circuit for providing a parallel circuit path between said second terminal and said first terminal when enabled whereby said charge storage device is charged and discharged at a faster rate than when said switching means is disabled.

6. The speakerphone of claim 5 wherein said switching means includes:

a first transistor having an emitter and a collector coupled between said first and second terminals and a base; and third current source means coupled between said base of said first transistor and said logic control circuit for supplying base current drive to said first transistor when rendered operative by said logic control circuit.

7. The speakerphone of claim 6 wherein the detector circuit includes:

a first logarithmic amplifier having an input coupled to the transmit signal path at the input of said transmit attenuator and an output; and a first signal-to-noise detector having an input coupled to the output of said logarithmic amplifier and an output coupled to the control circuit.

8. The speakerphone of claim 7 wherein said additional detector circuit includes;

a second logarithmic amplifier having an input coupled to the receive signal path at the input of said receive attenuator and an output; and a second signal-to-noise detector having an input coupled to said output of said second logarithmic amplifier and an output coupled to the control circuit.

9. The speakerphone of claim 8 including:

a third logarithmic amplifier having an input coupled to the transmit signal path at the output of said transmit attenuator and an output coupled to said first input of said first comparator; and a fourth logarithmic amplifier having an input coupled to the receive signal path at the output of said receive attenuator and an output coupled to said second input of said second comparator.

10. The speakerphone of claim 9 wherein:

said second input of said first comparator is coupled to said output of said second logarithmic amplifier; and said first input of said second comparator is coupled to said output of said first logarithmic amplifier.

11. The speakerphone of claim 5 wherein the detector circuit includes:

a first logarithmic amplifier having an input coupled to the transmit signal path at the input of said transmit attenuator and an output; and a first signal-to-noise detector having an input coupled to the output of said logarithmic amplifier and an output coupled to the control circuit.

12. The speakerphone of claim 11 wherein said additional detector circuit includes;

a second logarithmic amplifier having an input coupled to the receive signal path at the input of said receive attenuator and an output; and a second signal-to-noise detector having an input coupled to said output of said second logarithmic amplifier and an output coupled to the control circuit.

13. The speakerphone of claim 12 including:

a third logarithmic amplifier having an input coupled to the transmit signal path at the output of said transmit attenuator and an output coupled to said first input of said first comparator; and a fourth logarithmic amplifier having an input coupled to the receive signal path at the output of said receive attenuator and an output coupled to said second input of said second comparator.

14. The speakerphone of claim 13 wherein:

said second input of said first comparator is coupled to said output of said second logarithmic amplifier; and said first input of said second comparator is coupled to said output of said first logarithmic amplifier.

15. A speakerphone, comprising:

a transmit signal path coupled between an input and an output of the speakerphone and including a transmit attenuator;

a receive signal path coupled between an input and an output of the speakerphone and including a receive attenuator, said receive and said transmit attenuators operating in a complementary manner such that as the gain of one is maximized the gain of the other is minimized;

circuit means for sensing the relative amplitudes of said transmit and said receive signals appearing at the respective inputs and outputs of said transmit and receive attenuators for providing logic control signals at outputs thereof; and a control circuit responsive to said logic control signals for providing a control voltage the magnitude of which is varied to selectively vary the gains of said transmit and receive attenuators, said control circuit being responsive to a first set of the logic control signals for setting the gains of said attenuators to a mid-range value within a first time interval and being responsive to a second set of logic control signals for setting the gains of said attenuators to said mid-range value within a second time interval, said first interval being significantly shorter than said second interval.

16. The speakerphone of claim 15 wherein said circuit means includes:
a first comparator having first and second inputs coupled respectively to the output of the transmit attenuator and the input of the receive attenuator for sensing which of the signals in the transmit and receive signal paths appearing thereat is greater in amplitude to provide an output logic control signal to the control circuit having first and second level states depending on which of said signals is the greater;
a second comparator having first and second inputs coupled respectively to the input of the transmit attenuator and the output of the receive attenuator for sensing which of the signals in the transmit and receive signal paths appearing thereat is greater in amplitude and providing an output logic control signal to the control circuit having first and second output levels depending on which of said signals is the greater; and
said control circuit being responsive to said output logic control signals of said first and said second comparators being in opposite output level states for transiently setting the gains of the transmit and receive attenuators to said mid-range value 17. The speakerphone of claim 16 including:
a detector circuit for sensing if the transmit signal is voice to provide an output logic control signal to said control circuit;
an additional detector circuit for sensing if the receive signal is voice to provide an output logic control signal to the control circuit; and
said control circuit being responsive to the output logic control signal from the detector circuit and said output logic control signals from said first and second comparator and said additional detector circuit for selectively varying said control voltage provided therefrom to vary the gains of the transmit and receive attenuators accordingly.

18. The speakerphone of claim 17 wherein said control circuit includes:
first current source means for sinking a current at an output thereof when rendered operative;
second current means for sourcing a current at an output thereof when rendered operative; and
logic control circuitry responsive to said output signals supplied from said first and said second comparators, said additional detector circuit and the detector circuit for selectively rendering said first and second current source means operative.

19. The speakerphone of claim 18 wherein said control circuit includes:
a differential amplifier having first and second inputs and outputs for providing the control voltage between said first and said second outputs, said first input being coupled to a first terminal at which is supplied a bias potential and said second input being coupled both to said outputs of said first and said second current source means and to a second terminal;
charge storage device connected to said second terminal; and
resistive means connected between said charge storage device and said first terminal for providing a charge and discharge circuit path for said charge storage device.

20. The speakerphone of claim 19 wherein said control circuit includes switching means which is selectively enabled and disabled by said logic control circuit for providing a parallel circuit path between said second terminal and said first terminal when enable whereby said charge storage device is charge and discharged at a faster rate than when said switching means is disabled.

21. The speakerphone of claim 20 wherein said switching means includes:
a first transistor having an emitter and a collector coupled between said first and second terminals and a base; and
third current source means coupled between said base of said first transistor and said logic control circuit for supplying base current drive to said first transistor when rendered operative by said logic control circuit.

22. The speakerphone of claim 21 wherein the detector circuit includes:
a first logarithmic amplifier having an input coupled to the transmit signal path at the input of said transmit attenuator and an output; and
a first signal-to-noise detector having an input coupled to the output of said logarithmic amplifier and an output coupled to the control circuit.

23. The speakerphone of claim 22 wherein said additional detector circuit includes;
a second logarithmic amplifier having an input coupled to the receive signal path at the input of said receive attenuator and an output; and
a second signal-to-noise detector having an input coupled to said output of said second logarithmic amplifier and an output coupled to the control circuit.

24. The speakerphone of claim 23 including:
a third logarithmic amplifier having an input coupled to the transmit signal path at the output of said transmit attenuator and an output coupled to said first input of said first comparator; and
a fourth logarithmic amplifier having an input coupled to the receive signal path at the output of said receive attenuator and an output coupled to said second input of said second comparator.

25. The speakerphone of claim 24 wherein:
said second input of said first comparator is coupled to said output of said second logarithmic amplifier; and
said first input of said second comparator is coupled to said output of said first logarithmic amplifier.

* * * * *